US006208632B1

(12) United States Patent
Kowalski et al.

(10) Patent No.: US 6,208,632 B1
(45) Date of Patent: Mar. 27, 2001

(54) SYSTEM AND METHOD FOR CDMA CHANNEL ESTIMATION

(75) Inventors: John M. Kowalski; Srinivas Kandala, both of Vancouver, WA (US); V. Srinivasa Somayazulu, Tigard, OR (US)

(73) Assignee: Sharp Laboratories of America, Camas, WA (US)

( * ) Notice: Subject to any disclaimer, the term of this patent is extended or adjusted under 35 U.S.C. 154(b) by 0 days.

(21) Appl. No.: 09/015,424

(22) Filed: Jan. 29, 1998

(51) Int. Cl.$^7$ .................................................. H04B 7/216
(52) U.S. Cl. ............................................ 370/335; 370/342
(58) Field of Search .................................... 370/335, 320, 370/324, 328, 334, 339, 342, 350, 487, 488, 490, 491, 500, 503, 508, 509, 519; 375/130, 136, 140, 142, 143, 147, 149, 150, 215; 455/407, 408

(56) References Cited

U.S. PATENT DOCUMENTS

| 5,109,390 | 4/1992 | Gilhousen et al. | 375/1 |
|---|---|---|---|
| 5,329,547 | 7/1994 | Ling | 375/1 |
| 5,568,472 | 10/1996 | Umeda et al. | 370/18 |
| 5,586,113 | 12/1996 | Adachi et al. | 370/342 |
| 5,619,524 | 4/1997 | Ling et al. | 375/200 |
| 5,638,362 | 6/1997 | Dohi et al. | 370/342 |

(List continued on next page.)

FOREIGN PATENT DOCUMENTS

| 0696856 | 2/1996 | (EP) . |
| 0795971 | 9/1997 | (EP) . |
| 0825737 | 2/1998 | (EP) . |
| WO 9430024 | 12/1994 | (WO) . |
| WO 9733400 | 9/1997 | (WO) . |

OTHER PUBLICATIONS

Article entitled, "Wideband–CDMA Radio Control Techniques for Third–Generation Mobile Communication Systems", by S. Onoe, K. Ohno, K. Yamagata and T. Nakamura, published by 1997 IEEE, pp. 835–839.

Article entitled, Experiments on Coherent Multicode DS–CDMA, by T. Dohi, Y. Okumura, A. Higashi, K. Ohno and F. Adachi, published by IEICE Trans. Commun. vol. E79–B No. 9, Sep. 1996, pp. 1326–1332.

(List continued on next page.)

Primary Examiner—Douglas Olms
Assistant Examiner—Phirin Sam
(74) Attorney, Agent, or Firm—David C. Ripma; Matthew D. Rabdau; Scott Krieger

(57) ABSTRACT

A wideband CDMA receiver system to accept messages from asynchronously transmitting base stations is provided. The base station transmission to each receiver includes a perch channel and at least one traffic channel. Although all the channels typically include pilot symbols for the purpose of demodulating the information symbols of the channel, the pilot channel includes a higher proportion of pilot symbols to information symbols. Therefore, a perch channel based timing and estimation system is inherently more accurate. In addition, the perch channel is generally transmitted at higher power levels than a traffic channel, and the resulting, higher, signal to noise ratio signal also improves the accuracy of the timing and channel estimation. Based on the timing derived from the perch channel of a first base station, the receiver can set the timing of the traffic channel transmissions from a second base station, to more closely match the timing of traffic channel transmissions from the first base station. In this manner, the signal to noise ratio of the demodulated traffic channel information symbols is enhanced through the diversity of using the transmissions of two base stations. A method for receiving wideband CDMA transmissions from asynchronously transmitting base stations is also provided.

28 Claims, 7 Drawing Sheets

U.S. PATENT DOCUMENTS

| | | | | |
|---|---|---|---|---|
| 5,822,359 | * | 4/2000 | Bruckert et al. | 375/145 |
| 5,872,808 | * | 2/1999 | Davidovici et al. | 375/152 |
| 5,943,362 | * | 8/1999 | Saito | 375/143 |
| 5,950,131 | * | 9/1999 | Vilmur | 455/434 |
| 5,956,367 | * | 9/1999 | Koo et al. | 375/149 |
| 5,982,763 | * | 11/1999 | Sato | 370/342 |
| 5,991,330 | * | 11/1999 | Dahlman et al. | 375/149 |
| 6,026,115 | * | 2/2000 | Higashi et al. | 370/335 |
| 6,055,231 | * | 4/2000 | Mesecher et al. | 370/342 |

OTHER PUBLICATIONS

Article entitled, Fast Cell Search Algorithm in DS–CDMA Mobile Radio Using Long Spreading Codes, by K. Higuchi, M. Sawahashi and F. Adachi, published in IEEE VTC Conference, pp. 1430–1434, May, 1997.

Article entitled, "Coherent Multicode DS–CDMA Mobile Radio Access", by F. Adachi, K. Ohno, A. Higashi, T. Dohi and Y. Okumurai published in IEICE Trans. Commun. vol. E79–B, No. 9 Sep., 1996.

Document entitled "An Overview of the Application of Code Division Multiple Access (CDMA) to Digital Cellular Systems and Personal Cellular Networks", May 21, 1992, updated and retitled version submitted to TIA TR45.5 Subcommittee on Mar. 28, 1992, pp. 1–57.

* cited by examiner

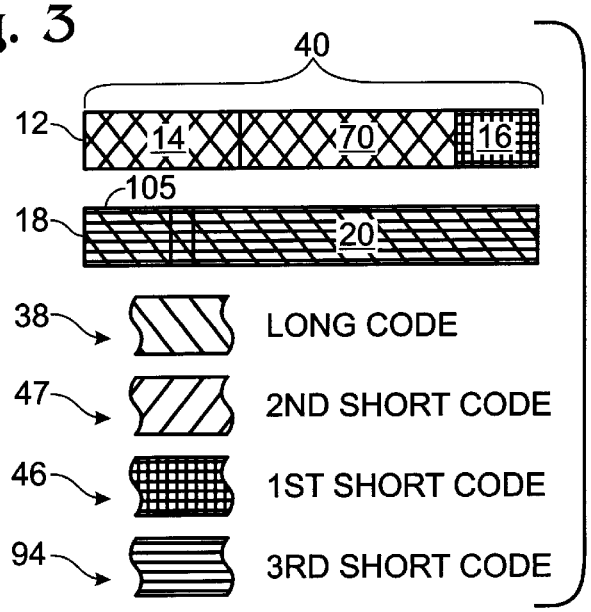
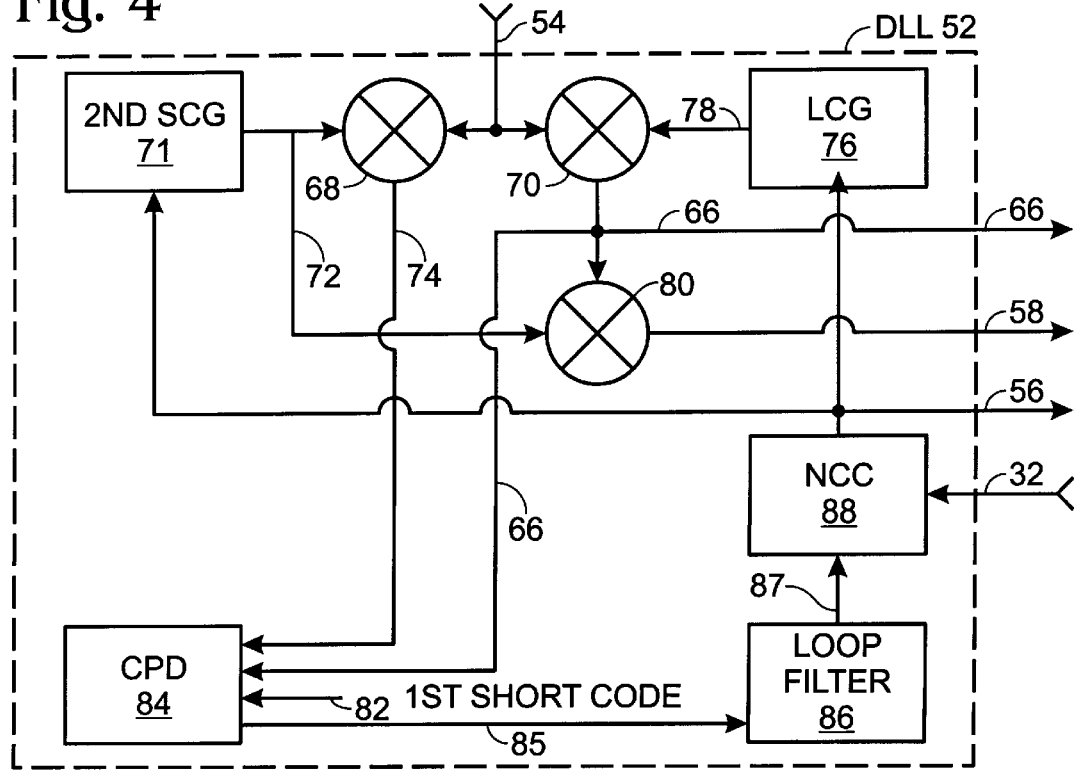

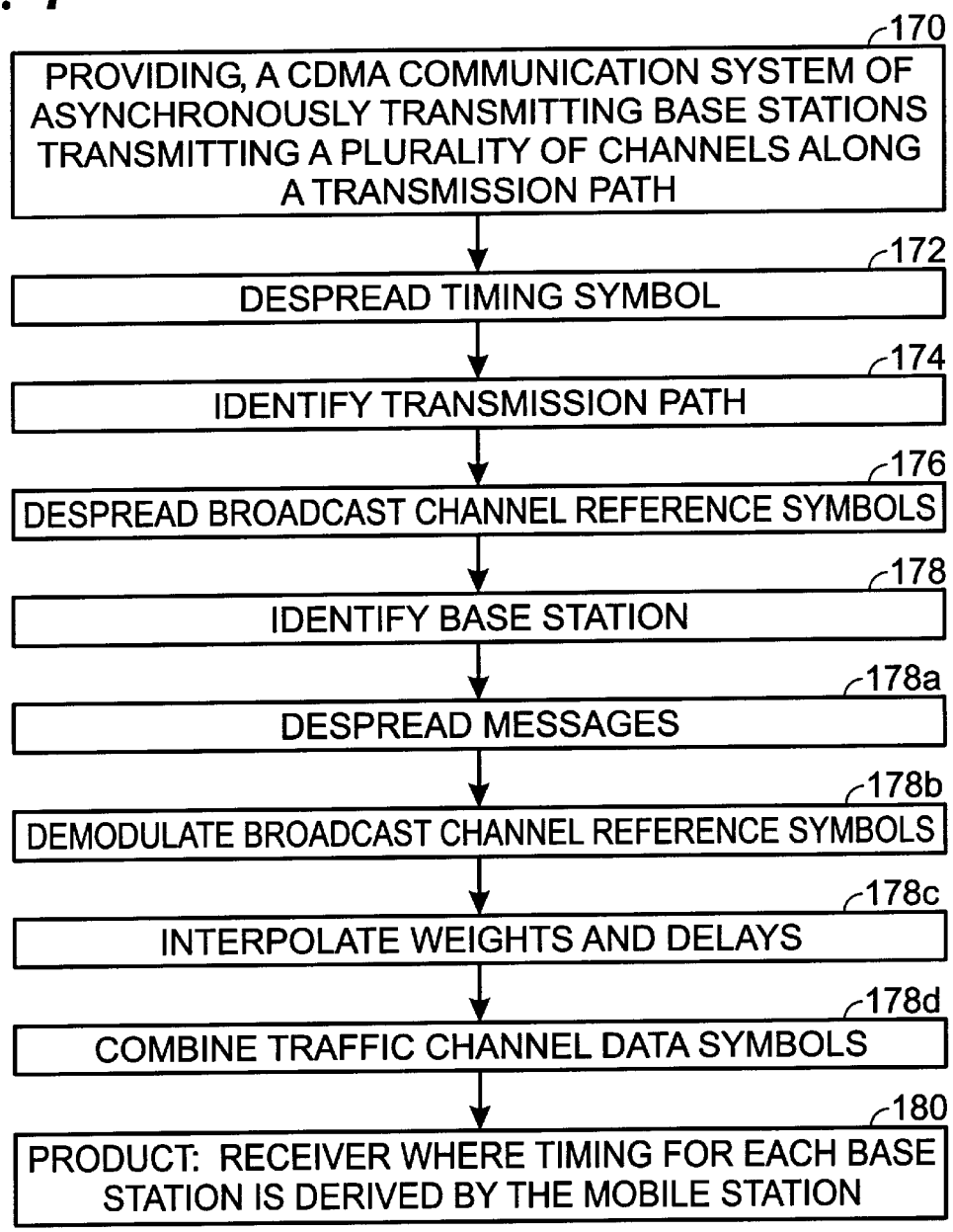

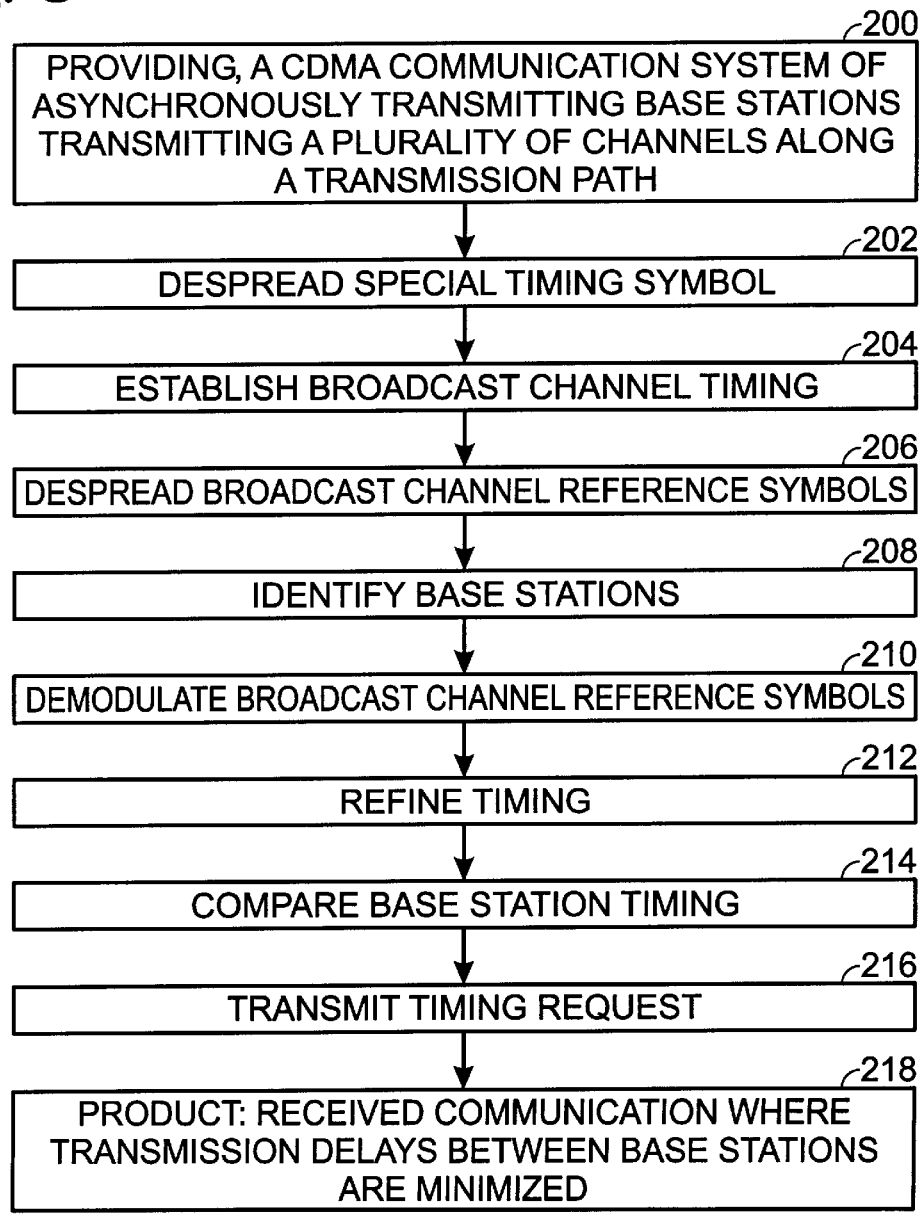

SYSTEM AND METHOD FOR CDMA CHANNEL ESTIMATION

BACKGROUND AND SUMMARY OF THE INVENTION

This invention relates generally to cellular telephone communications, and more particularly to a system and method for mobile stations to use the timing information derived from the perch channel of an asynchronously transmitting base station to demodulate a traffic channel message.

Spread spectrum communication techniques allow communicating users to operate in noisy radio frequency (RF) spectrums, and are especially effective against narrow-band interferers. Spread spectrum communications can be effected at relatively low power spectral densities, and multiple users can share the same frequency spectrum. Further, receivers can be designed to protect against multipath. These system characteristics encouraged early development of the technology by the military.

Common forms of spread spectrum systems include chirp, frequency hopping, and direct sequence or pseudonoise (PN). The chirp system transmits an impulse signal in the time domain that is spread monotonically in the frequency domain. A receiver converts the spread frequency signal back into an impulse signal. These frequency-spread impulse signals have applications in radar, for the pulse position modulation of information, or both, such as the $R^3$ transponder developed by General Dynamics, Electronics Division in the 1970s. Frequency hopping systems communicate by synchronizing users to simultaneously change the communication frequency.

Direct Sequence systems spread a digital stream of information, typically in a quadriphase modulation format, with a PN code generator, to phase shift key modulate a carrier signal. The pseudonoise sequence of the PN code generator is periodic, and the spread signal can be despread in a receiver with a matching PN code. Direct Sequence systems have excellent immunity to noise. The PN codes used typically permit a large number of users to share the spectrum, with a minimum of correlation between the user's PN codes. However, Direct Sequence system require large RF bandwidths and long acquisition times.

The IS-95 standard defines key features of the so-called second generation code division multiple access (CDMA) communication system, a type of Direct Sequence spread spectrum modulation. To help solve the problem of long acquisition time, the IS-95 signal uses a pilot channel. Each base station transmits a pilot channel message spread with PN codes known to all the mobile stations. The PN code is made up a series of phase shifted binary symbols called chips. The PN period is 32,768 chips and the PN chip rate is 1.2288 Megahertz (Mhz). The digital stream of information that is spread by the PN code is also known to the mobile stations. Because there is no ambiguity in the demodulated message, the timing characteristics of the PN code, down to the chip phase, as well as the QPSK modulation phase are known to the mobile station receiver.

The IS-95 system communicates information from the base station to the mobile stations through a series of traffic channels. These traffic channels are transmit and receive information, i.e. digitized audio signals, spread with a traffic channel PN code, unique to each mobile station. Using this precise timing and phase information derived from the pilot channel, the mobile station is able to acquire a setup channel, and eventually, the overall System Time. With this System Time, the mobile station is able to differentiate between base stations and synchronize the demodulation circuitry with sufficient accuracy to recover the received traffic channel message.

A third generation, wideband CDMA (W-CDMA) system is in development as described in "Wideband-CDMA Radio Control Techniques for Third Generation Mobile Communication Systems", written by one et al., IEEE 47$^{th}$ Vehicular Technology Conference Proceedings, May 1997, that may have global applications. Instead of a pilot channel, the W-CDMA system has a broadcast, or perch channel. Each timeslot, or slot of the broadcast channel consists of a series of time multiplexed symbols. A long code masked, or special timing symbol segment uses just a short code to spread one symbol of known information. This segment allows a mobile station to acquire system timing information immediately after turn-on. The pilot, or reference symbols are similar to the IS-95 pilot channel. In one proposal, 4 reference symbols, with each symbol being 2 bits, are spread with a long code and a short code. The reference symbol information and the short code are known by the mobile stations. The long code is unique to each base station, so that timing information is refined, once the long code is known (the base station is identified). Therefore, according to some proposals, 5 symbols in the slot would be dedicated to the mobile station acquiring timing information. Further, both the long and short codes spread 5 symbols of data during each slot. Since information is not predetermined for the data symbols, precise timing information cannot be accurately recovered, as with the other two kinds of (timing) symbols. Other combinations of reference, special timing, and data symbols are also possible.

The W-CDMA system also includes several traffic channels to communicate information, such as a digitized voice or data. The traffic channel predominately includes information, but may also include a reference symbol segment. For example, at a data rate of 32 kilosymbols per second (ksps), a slot could include 4 pilot symbols and 16 information symbols. Precise timing information can be derived during the reference symbols segment of the traffic channel message, but not during the information segments.

The W-CDMA, or any spread spectrum system, operates best by minimizing the transmitted power of the users. Lower spectral power densities permit additional users to be added to the system, or an increase in the signal to noise ratio of received messages. Each mobile station is likely to receive more than one traffic channel from a base station, with each traffic channel being unique to a mobile station. That is, each base station is capable of transmitting hundreds of different traffic channels, the exact number is dependent on the traffic channel data rates. However, each base station transmits only a few, perhaps only one, broadcast channels that are used by all the receiving mobile stations. It is advantageous for the system that the base stations transmit the shared broadcast channels at a higher power level than the mobile station specific traffic channels. For this reason, the broadcast channel power is maintained at a relatively high level, while the traffic channel levels are continually monitored and adjusted to keep the transmitted power levels only as large as necessary to reasonably enable communication between the base station and the mobile.

Unlike the IS-95 system, the W-CDMA system does not use a master System Time to synchronize the base station transmissions. Each mobile station must independently acquire sufficient timing information regarding each base station to recover messages from that base station. The mobile station must simultaneously maintain timing information for multiple non-synchronously transmitting base stations.

Gilhousen, et al., U.S. Pat. No. 5,109,390, disclose a spread spectrum receiver capable of differentiating multiple pilot signals and selecting the signal of greatest strength. The transmitting base stations are synchronized to operate from a master clock. Receiving mobile stations can maintain timing accuracy sufficient to demodulate received messages from all base stations by monitoring the pilot channel of any single base station. However, Gilhousen et al. do not disclose a method of conveniently receiving communications from asynchronously transmitting base stations.

Ling, U.S. Pat. No. 5,329,547 discloses a method of inserting reference symbols into a stream of spread spectrum data symbols. The reference symbols help generate a channel estimate. That is, the insertion of predetermined data, or reference symbols into the data stream helps eliminate phase ambiguity in demodulating unknown data symbols. However, Ling does not disclose a method of synchronizing the timing between a plurality of received channels.

It would be advantageous if a W-CDMA receiver were developed to acquire the channels of a first asynchronously transmitting base station independent of the transmissions of other base stations. It would also be advantageous if the receiver could direct a plurality of base stations to synchronize transmissions to take advantage of the diversity provided by receiving from several base stations.

It would be advantageous if the base station transmitted broadcast, or perch channel could be used by a mobile station to maintain timing for all channels received from that base station.

It would be advantageous if the amount of channel information present in the structure of a receiver multichannel CDMA waveform was maximally utilized.

It would be advantageous if the broadcast channel in a W-CDMA system, generally having more transmitted power than the traffic channels and a greater number of reference symbols, could be used by a mobile station to demodulate the traffic channel.

It would be advantageous if the channel estimates derived from the broadcast channel could be applied to all the received channels of the same transmission path. In this manner, the channel estimate need be performed only once.

Accordingly, a method of receiving communications in a CDMA communication system, including a plurality of base stations asynchronously transmitting information to a plurality of mobile stations, is provided. The communications from a base station to a mobile station are formatted in a plurality of channels. Due to multipath, these communications are propagated along at least one transmission path, with a corresponding path delay. Each of these communications can be considered a family of related channels, so that families of channels propagate along the same transmission path. A method for each mobile station to receive base station communications comprises the steps of:

a) for each base station from which a communication is received, identifying at least one transmission path between a base station and the mobile station. Typically a mobile station is able to identify a base station communication along several transmission paths; and b) in response to the transmission paths identified in Step a), despreading at least one received communication. That is, in an asynchronous system of transmissions, the mobile station is able to recover the data symbols in the communication in response to timing information recovered from locking the receiver onto any one of the multipathed base station transmissions.

Each base station transmission includes a broadcast channel message with a plurality of predetermined time multiplexed symbols, including a predetermined special timing symbol known to each mobile station. Step a) includes, for each transmission path identified in Step a), despreading the special timing symbol, whereby broadcast channel multiplex timing information is derived. Further steps include:

$a_1$) in response to special timing symbol despread in Step a), calculating channel timing information for each transmission path detected in Step a); and in which Step b) includes despreading received communications in response to the channel timing information calculated in Step $a_1$).

The broadcast channel message includes time multiplexed data symbols, and predetermined time multiplexed reference symbols known to the mobile station. Step b) includes despreading the broadcast channel data and reference symbols. Initially, the channel timing is found by despreading the special timing signal in Step $a_1$). The timing is improved by despreading the reference symbols in Step b).

Each base station transmits at least one traffic channel message, unique to each mobile station. The traffic channel has a plurality of time multiplexed data symbols. Step b) includes despreading the traffic channel data symbols. Since the reference and data symbols for both the traffic and broadcast channels are modulated before transmission, the method of the present invention includes the further steps, following Step b), of:

c) in response to the broadcast channel reference symbols despread in Step b), demodulating the broadcast channel reference symbols to provide transmission path weights and phase shift information;

d) in response to the weights and phase shifts provided is during the demodulation of the broadcast channel reference symbols, estimating weights and phase shifts to apply to data symbols; and e) in response to estimations made in Step d), demodulating the broadcast and traffic channel data symbols.

Each traffic channel message includes predetermined time multiplexed reference symbols known to each mobile station, which are modulated before transmission. In some aspects of the invention, Step b) includes despreading the traffic channel reference symbols. Then, the traffic channel reference symbols are demodulated to provide transmission path weights and phase shift information. In addition, the weights and phase shifts provided from the demodulation of the traffic channel reference symbols are used to estimate weights and phase shifts to apply to the demodulation of the traffic channel data symbols.

Ultimately, the broadcast channel data symbols demodulated for each transmission path are combined in a RAKE receiver to improve the signal to noise ratio of a received message. This process occurs by combining the received transmissions of each base station.

A mobile station receiver to accept base station communications is provided. The receiver comprises at least a first filter matched to despread the broadcast channel special timing symbol. The first matched filter accepts the broadcast channel special timing symbol received for each transmission path from a communicating base station, and provides the despread special timing symbol for each transmission path.

The receiver also comprises a timing and code management circuit connected to the first matched filter output to accept despread special timing symbols for each transmission path. The timing and code management circuit provides the despread broadcast channel special timing symbol for each transmission path, and a second output provides the broadcast channel multiplex timing information and base station identification for each transmission path.

The receiver comprises a traffic channel RAKE receiver having a plurality of fingers. Each finger is operatively connected to the timing and code management circuit second output. Each finger uses the broadcast channel multiplex timing and base station identification information provided by the timing and code management circuit to despread the traffic channel data symbols for each transmission path. The timing and coding needed to despread the traffic channel results from despreading the broadcast channel.

Each base station is assigned a unique long code, and the base stations transmit broadcast channel reference symbols spread with their long code. The mobile station's receiver further comprises a searcher unit to accept the broadcast channel reference symbols for each transmission path. A second searcher input, connected to the timing and code management circuit, accepts the despread broadcast channel special timing symbol for each transmission path. The searcher unit identifies the long code for the broadcast channel received on each transmission path, and provides the long code of the broadcast channel for each transmission path. The timing and code management circuit, connected to the searcher, accepts the broadcast channel long code for each transmission path. The timing and code management circuit second output provides broadcast channel long codes, as well as despread special timing symbols, for each transmission path.

The mobile station receiver further includes a broadcast channel RAKE receiver with a plurality of fingers, with each finger assigned to a received message transmission path. The broadcast channel RAKE receiver comprises a delay locked loop (DLL) to provide a clock at a first chip rate and a long code despread signal, which is the product of the long code times the channel messages of a transmission path. The DLL also despreads the broadcast channel message. A broadcast channel estimation and weighting circuit demodulates the broadcast channel reference symbols to determine the assigned transmission path weights and phase shifts, and to estimate weights and phase shifts to apply during the demodulation of broadcast and traffic channel information symbols. A first summing circuit combines the demodulated broadcast channel data symbols.

The receiver comprises a traffic channel RAKE receiver with fingers corresponding to the broadcast channel fingers having the same assigned transmission path. Each traffic channel RAKE receiver finger despreads and demodulates the traffic channel data symbols. A traffic channel estimation and weighting circuit accepts the despread traffic channel data symbols, and is connected to the broadcast channel estimation and weighting circuit to accept the estimated weights and phase shifts to aid in the demodulation of the traffic channel data symbols. In some aspects of the invention, the traffic channel estimation and weighting circuit also demodulates the traffic channel reference symbols to determine the assigned transmission path weights and phase shifts, and estimates the weights and phase shifts for application in the demodulation of traffic channel data symbols. Several second summing circuits, each second summing circuit being assigned the various transmission paths of one base station, combine the outputs of several traffic channel estimation and weighting circuits. A third summing circuit combines the results from each base station (each second summing circuit) to improve the quality of the received traffic channel message.

BRIEF DESCRIPTION OF THE DRAWINGS

FIG. 3 illustrates the spreading codes assigned each mobile station during a slot, as defined in the timing diagram of FIG. 2.

FIG. 4 is a more detailed depiction of the delay locker loop DLL) of FIG. 1.

FIG. 7 is a flow chart illustrating steps in a method for a mobile station to receive base station communications in accordance with an aspect of the present invention.

FIG. 8 is a flow chart illustrating the present invention's method for a mobile station to synchronize communications from at least two asynchronously transmitting base stations.

DETAILED DESCRIPTION OF THE PREFERRED EMBODIMENT

Figure 1:
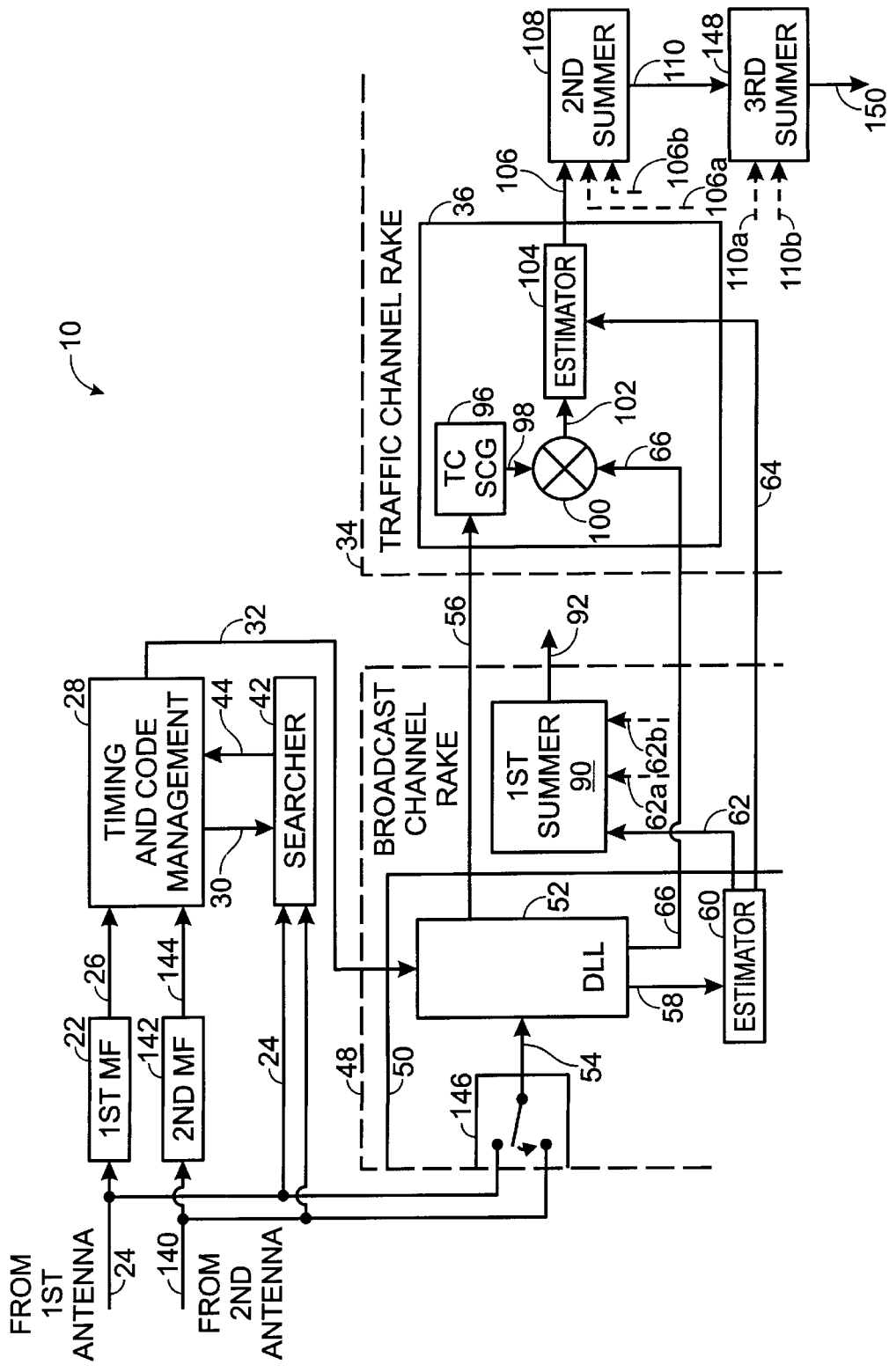
FIG. 1 is a schematic block diagram of the receiving system of the present invention.

FIG. 1 is a schematic block diagram of the receiving system 10 of the present invention. A code division multiple access (CDMA) communication network has a plurality of base stations (not shown) asynchronously transmitting information to a plurality of mobile stations. Each mobile station includes a receiver, such as receiver 10. The coded communications from a base station to a mobile station are formatted in a plurality of channels including a broadcast channel message and at least one traffic channel message (see FIG. 2). Typically, each mobile station receives a number of traffic and access channels from a base station, once communication has been established between the two users. Several types of channels are used in this system. Two channels of great importance are the perch and traffic channels (TCH). The perch channel is a physical broadcast channel, i.e., a physical channel that is broadcast to users regardless of whether they have established other physical channels for communication. The perch channel comprises timing (reference) symbols, a pilot signal (special timing symbol) for channel estimation, and a logical broadcast channel (data symbols) designated as BCCH, used for the broadcast of system information. As suggested in some proposals, the perch channel could operate at 16 ksps, and the traffic channels (TCHs) at 32, 64, 128, 256, 512 and 1024 ksps. For the purposes of clarity and simplicity, only the receipt of a single broadcast channel and a single traffic channel is described below.

As is well known in the art, multipath typically exists between two users communicating with an RF carrier frequency. The multipath is caused as a signal "bounces" off geographical features or obstacles. To receive a transmission, each broadcast and traffic channel is propagated along at least one transmission path, with a corresponding path delay. In some systems, multipath is intentionally added with transmissions from the base station being radiated by two or more antennas. Multiple paths add robustness to the transmissions by creating alternate paths between users and the base station. A more detailed explanation follows in the description of FIG. 5.

Figure 2:
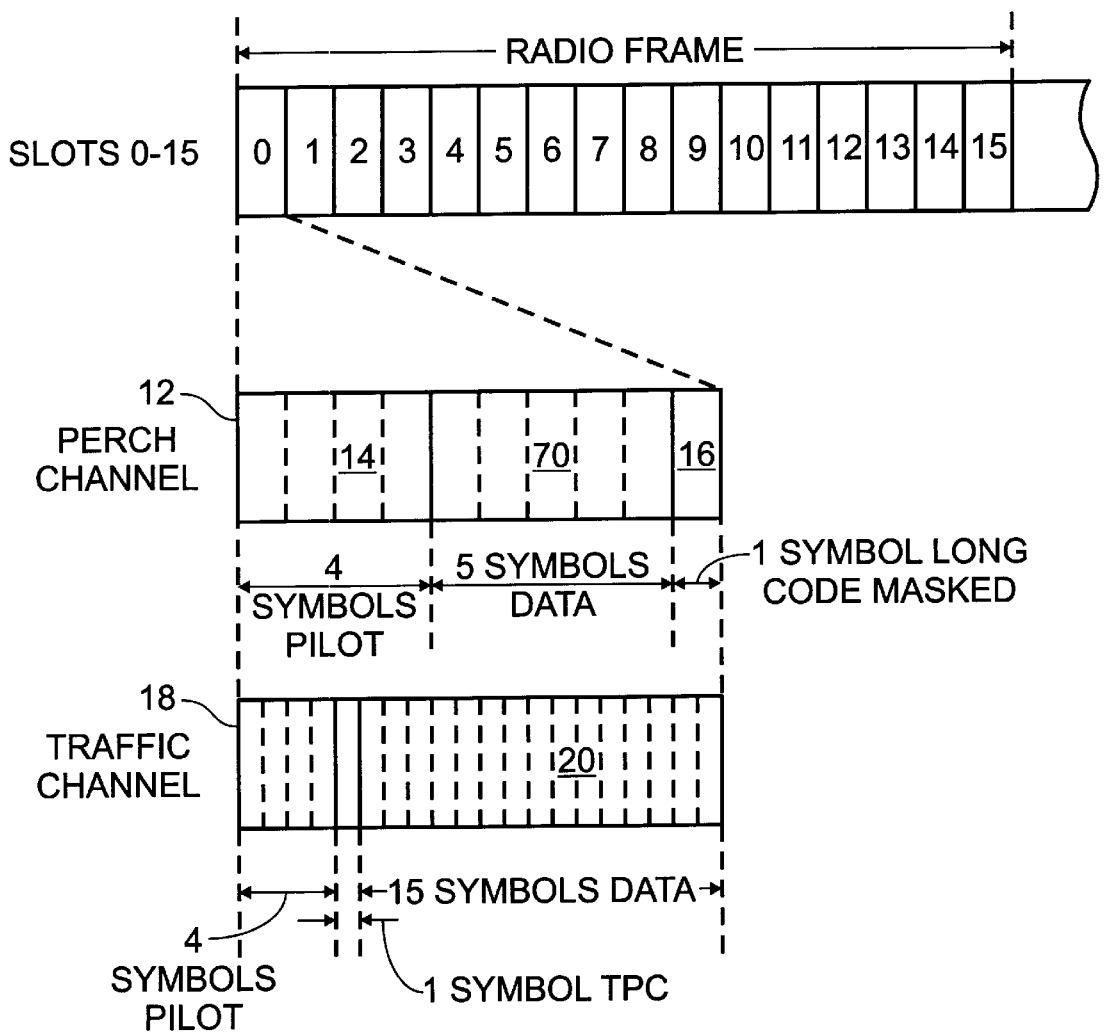
FIG. 2 illustrates the broadcast and traffic channel message format and frame structure transmitted by a base station.

FIG. 2 illustrates the broadcast and traffic channel message format and frame structure transmitted by a base station. The perch, or broadcast channel message depicted in slot 1, labeled with reference designator 12, includes predetermined time multiplexed reference, or pilot symbols 14 and a special timing, or long code masked symbol 16. The traffic channels message, labeled with reference designator 18, includes time multiplexed data symbols 20.

Returning again to FIG. 1, mobile station receiver 10 comprises at least a first filter 22 matched to despread the broadcast channel special timing symbol, see FIG. 2, reference designator 16. First matched filter 22 has an input on line 24 to accept the broadcast channel special timing symbol received for each transmission path from a communicating base station. First matched filter 22 has a first output on line 26 to provide the despread special timing symbol for each transmission path. In this manner, multiplex timing information for the broadcast channel is provided.

A timing and code management circuit 28, having a first input operatively connected to first matched filter 22 output on line 26, accepts despread special timing symbols for each transmission path. Timing and code management circuit 28 has a first output on line 30 to provide the despread broadcast channel special timing symbol for each transmission path, and a second output on line 32 to provide channel multiplex timing information and base station identification for each transmission path.

A traffic channel RAKE receiver 34, depicted with dotted lines, has a plurality of fingers. For the purposes of simplicity and clarity, only a single finger 36 is depicted in FIG. 1. However, the operation of the other traffic channel RAKE receiver fingers is the same as finger 36. Each finger, including finger 36, has an input operatively connected to timing and code management circuit 28 second output on line 32. Finger 36 uses the broadcast channel multiplex timing and base station identification information provided by timing and code management circuit 28 to despread the traffic channel data symbols (see FIG. 2, reference designator 20) for each transmission path. The timing and codes needed to despread the traffic channel results from despreading the broadcast channel.

FIG. 3 illustrates the spreading codes assigned each mobile station during a slot, as defined in the timing diagram of FIG. 2. Each base station in the communications system is assigned a unique long code, and the base stations transmit broadcast channel reference symbols spread with their long code. The long code is represented by "left-leaning" hatched lines represented by reference designator 38. For a majority of the slot duration, including the time duration of reference symbols 14, broadcast channel message 12 is spread with long code 38. This duration of time is represented by reference designator 40.

Returning again to FIG. 1, receiver 10 further comprises a searcher unit 42 having a first input on line 24 to accept the broadcast channel reference symbols for each transmission path. That is, searcher 42 accepts all the multipath transmissions from a base station. Searcher 42 also accepts all transmissions from all received base stations. A second input is operatively connected to timing and code management circuit 28 first output on line 30 to accept the despread broadcast channel special timing symbol for each transmission path. Searcher unit 42 identifies the long code (see FIG. 3, reference designator 38) for the broadcast channel received on each transmission path. Searcher unit 42 has an output on line 44 to provide the long code of the broadcast channel for each transmission path. Since there are a limited number of long codes, searcher 42 is typically designed to test a series of stored codes against the received codes until a match occurs. In this manner, the base station is identified.

Timing and code management circuit 28 includes a second input on line 44 operatively connected to searcher unit 42 output on line 44 to accept the broadcast channel long code for each transmission path. The second output on line 32 provides broadcast channel long codes, as well as channel timing information, for each transmission path.

Each base station transmits broadcast and traffic channel messages modulated at a predetermined first chip rate, which is the rate at which the PN long code spreads a segment of information. Typically, the information, whether data bits or timing bits, is modulated with quadrature phase shift keying (QPSK), although biphase modulation is also possible. The rate of modulation need not match the rate of spreading, or the chip rate. For example, in some aspects of the invention the chip rate varies from approximately 1 to 16 megachips per second (Mcps), while the rate of modulation varies from 16 to 1024 kilosymbols per second (ksps), where one symbol equals two bits.

Returning to FIG. 3, the transmitted broadcast channel special timing symbol 16 is spread with just a predetermined first short code, represented by horizontal and vertical crosshatched lines and reference designator 46. Since first short code 46 is common to, and known by all mobile stations, special timing symbol 16 is easily despread by first match filter 22, which is specifically designed to despread this code. During time duration 40, the broadcast channel reference symbols are spread with the long code 38 and a predetermined second short code represented by "right leaning" lines and reference designator 47. Traffic channel 18 data symbols (see FIG. 2, reference designator 20) are also spread with long code 38.

In FIG. 1, mobile station receiver 10 further includes a broadcast channel RAKE receiver 48, bounded by a dotted line. As with traffic channel RAKE 34, broadcast channel RAKE receiver 48 includes a plurality of fingers. Although only a single finger 50 is shown, the other fingers, not shown, operate equivalently to finger 50. Each finger, including finger 50, is assigned to a transmission path. Finger 50 of said broadcast channel RAKE receiver 48 comprises a delay locked loop (DLL) 52 having a first input operatively connected on line 32 to timing and code management circuit 28 second output. DLL 52 has a second input to accept broadcast and traffic channel messages on line 54, and an output on line 56 to provide the first chip rate clock signal.

Timing of the signals is derived by passing each of antenna signals on line 24 through short code (long code masked symbol) matched filter 22 and examining the peaks of the output. The derived timing is then sent to timing and code management block 28. Searcher unit 42 gets the timing from timing and code management block 28 and then searches for the long code of each path. The timing and the long codes are then sent to DLL 52 of finger 50, and other fingers (not shown) related to the same base station.

As mentioned above, each base station modulates the transmitted data and reference symbols. In FIGS. 2 and 3, broadcast channel message 12 includes five data symbols 70 being spread by the long code 38 and the second short code 47. Typically, the receiver system is operated with an available bandwidth of 5 MHz. The chip rate of the pseudonoise sequence for spreading the signal is 4.096 Mcps. The symbol rates that are supported by the system are 32, 64, 128, 256, 512 and 1024 ksps. The modulation method used for both data and spreading is QPSK.

Returning to FIG. 1, DLL 52 has a second output on line 58 to provide the despread broadcast channel data and reference symbols. As is well known in the art, the broadcast channel message is despread by multiplying the long code and the second short code by the received broadcast message of the assigned transmission path. During the time of the special timing symbol (reference designator 16, in FIG. 2), the broadcast channel message is despread by multiplying first short code 46 by the received transmission path channel message. Typically, second short code 47 is a simple pattern, such as all "1"s, so that the generation of these codes in DLL 52 is simplified.

A broadcast channel estimation and weighting circuit 60 has an input on line 58 operatively connected to DLL 52 second output to receive the despread broadcast channel reference and data symbols. Broadcast channel estimation and weighting circuit 60 demodulates the broadcast channel reference symbols (see FIG. 2, reference designator 14) to determine the assigned transmission path weights and phase shifts, and to estimate weights and phase shifts to apply during the demodulation of broadcast and traffic channel data symbols. Broadcast channel finger estimation and weighting circuit 60 has a first output to provide the demodulated broadcast channel data symbols, and a second output to provide weight and phase shift estimations for use with the traffic channel of the assigned transmission path.

At this point in the receiving process, the long code, first short code, second short code, and the chip rate clock have been generated in finger 50, and compared to the actual received message on line 54. During the time of the special timing symbol and reference symbols (see FIG. 2, reference designators 14 and 16, respectively) the demodulated information is known to receiver 10. This timing knowledge permits estimation and weighting circuit 60 to determine the channel gain and phase variations of the despread, but still modulated message, with the QPSK demodulator estimation and weighting circuit 60. With this information, the relative signal strength and phase shift of the transmission path is measured and the transmission path is assigned a gain in response.

Likewise, the transmission path is assigned a phase shift. These weights and phase shifts are estimated during the time of the reference and special timing symbols. This knowledge permits estimation and weighting circuit 60 to estimate the weights and phase shifts for application to the transmission path when broadcast channel data symbols, not already known, are received.

In one aspect of the invention, weights and phase shifts, applied during the demodulation of broadcast and traffic channel data symbols are interpolated from the known weights and phase shifts. In other aspects, the weights and delays are extrapolated. Interpolation and extrapolation will be discussed more fully, below.

Finger estimation and weighting circuit 50 has a first output on line 62 to provide the demodulated broadcast channel data symbols, and a second output on line 64 to provide weight and phase shift estimations for use with the traffic channel of the assigned transmission path.

As suggested in some proposals, the perch channel uses the code denoted as $C_8(0)$, which is all 1's, as the common second short code, the long code despread signal is essentially the perch channel despread signal for the duration during which the long code is not masked. DLL 52 has a third output on line 66 to provide the long code despread signal, which is a product of the long code multiplied by the broadcast and traffic channel messages.

The long code despread signal is also further despread by the respective short codes to obtain the signal on various channels. The despread signal is then passed through RAKE estimation and weighting circuit 60 to obtain "soft" decisions that are used in decoding the signal. Soft decisions are an output that have not been quantized, but must still be decoded by an forward error correction (FEC) decoder. Broadcast channel estimation and weighting circuit 60 in the perch channel has substantially the same function as the RAKE estimation and weighting circuit in the traffic channel (presented below).

FIG. 4 is a more detailed depiction of DLL 52 of FIG. 1. The received channels are input into DLL 52 on line 54, to drive first mixer 68 and second mixer 70. A second short code generator ($2^{nd}$ SCG) 71 also drives first mixer 68 with a signal on line 72, so that first mixer 68 has an output on line 74. Likewise, a long code generator (LCG) 76 drives second mixer 70 with a signal on line 78, so that second mixer 70 has an output on line 66. The output on line 66 is the long code despread signal exported from DLL 52 on line 66. The long code despread signal on line 66 and the second short code on line 72 drive third mixer 80 and produce the despread broadcast channel data and reference symbols on line 58.

The short code despread signal on line 74, the long code despread signal on line 66, and the first code on line 82 (which is generated either internal or external to DLL 52) are input to chip phase detector (CPH) 84. In some aspects of the invention second short code generator 71 outputs the first short code on line 72 during the time of the special timing symbol so that line 82 is eliminated. The output of CPH 84 on line 85 is input to loop filter 86. The output of loop filter 86 on line 87, along with the timing information on line 32, is input into numerically controlled clock (NCC) 88 to generate the clock signal at the first chip rate on line 56. The clock signal on line 56 in fed back to second short code generator 71 and long code generator 76 to maintain the correct phase relationship between the channel messages on line 54 and the generation of the codes.

A first summing circuit 90 has a plurality of inputs on lines 62, 62a, and 62b operatively connected to said broadcast channel estimation and weighting circuit 60 first output of each broadcast channel RAKE receiver finger, such as finger 50. That is, all the fingers of perch RAKE receiver 48, assigned to all transmission paths, are combined. Since the broadcast channel data symbols are the same for all base stations, there is no need to segregate transmission paths by base station. Dotted lines 62a and 62b represent connections to two other broadcast channel fingers (not shown). A plurality of fingers, typically six or less, are thus summed. First summing circuit 90 combines the demodulated broadcast channel data symbols to provide an output on line 92 with demodulated broadcast channel data symbols having an improved signal to noise ratio. Multipathed broadcast channel messages from all sources are combined.

Returning to FIG. 3, each base station assigns a third short code, represented by horizontal lines 94, which is unique for each mobile station, to each mobile station. Transmitted traffic channel data symbols 20 are spread with third short code 94, as well as long code 38.

In FIG. 1, each finger of traffic channel RAKE receiver 34 corresponds to a finger of broadcast channel receiver 48 having the same assigned transmission path. That is, broadcast channel RAKE finger 50 is assigned to the same transmission path as traffic channel RAKE finger 36. Traffic channel RAKE receiver finger 36 comprises a traffic channel short code generator (TF SCG) 96 to generate the third short code, having an input on line 56 operatively connected to DLL 52 first output to accept the first chip rate clock signal. Traffic channel short code generator 96 has an output on line 98 to provide the mobile station's assigned third short code at a rate matching the traffic channel message received on that transmission path.

A traffic channel mixer 100 has a first input operatively connected on line 98 to traffic channel short code generator 96 output, and a second input is operatively connected on line 66 to DLL 52 third output in corresponding broadcast channel finger 50, to accept the long code despread signal. Traffic channel mixer 100 has an output on line 102 to provide the despread traffic channel data symbols.

Traffic channel finger 36 further comprises a traffic channel estimation and weighting circuit 104 having a first input on line 102 operatively connected to the output of traffic channel mixer 100 to accept the despread traffic channel data symbols. A second input on line 64 is operatively connected to broadcast channel estimation and weighting circuit 60 second output in corresponding broadcast channel finger 50. Traffic channel estimation and weighting circuit 104 accepts the estimated weights and phase shifts from broadcast channel estimation and weighting circuit 60 to aid in the demodulation of the traffic channel data symbols. Traffic channel finger estimation and weighting circuit 104 has a first output on line 106 to provide the demodulated traffic channel data symbols. The heart of the present invention is the use of the broadcast channel timing information to demodulate the traffic channel. Since receiver 10 is likely to be receiving several other channels simultaneously with the traffic channel, the use of a single channel to time other channels transmitted from the same base station, or even multiple base stations, results in a considerable savings of hardware and computation time. Further, the use of the relatively high power broadcast channel results in timing relationships that are based on information having a higher signal to noise ratio.

In some aspects of the invention, traffic channel estimation and weighting circuit 104 demodulates the traffic channel reference symbols (see FIG. 3, reference designator 105) to determine the assigned transmission path weights and phase shifts, and estimates the weights and phase shifts for application in the demodulation of traffic channel data symbols. Using the reference symbols of the traffic channel to augment timing relationships derived from the broadcast channel, results in increased channel estimation accuracy at the expense of additional hardware.

A second summing circuit 108 has a plurality of inputs operatively connected with lines 106, 106a, and 106b to traffic channel estimation and weighting circuit output of each traffic channel RAKE receiver finger for a transmitting base station group. That is, only the traffic channel estimates from a single base are summed in second summing circuit 108. Unlike the broadcast channel, the traffic channels of different base stations cannot be simply summed. The traffic channel data symbols from different base stations are not the same. The difference is in the transmit power control (TPC) bit. This bit is a base station request to set or change the transmitting power level of the mobile station. It is possible for a first base station to request an increase in power, while a second base station requests a decrease, and in a mobile station response to one of the base station requests, a loss of communication with the other base stations results. Once the TPC bit is removed from the traffic channel data, the data from several base station is summed, as presented below.

Line 106 is shown operatively connecting estimation and weighting circuit 104 and second summing circuit 108. Other fingers (not shown) are represented by dotted lines 106a and 106b. Second summing circuit 108 has an output on line 110 to provide the sum of the demodulated traffic channel data symbols for each transmission path from a (the same) base station, whereby the signal to noise ratio of the received information is improved by combining signals of each transmission path.

Figure 5:
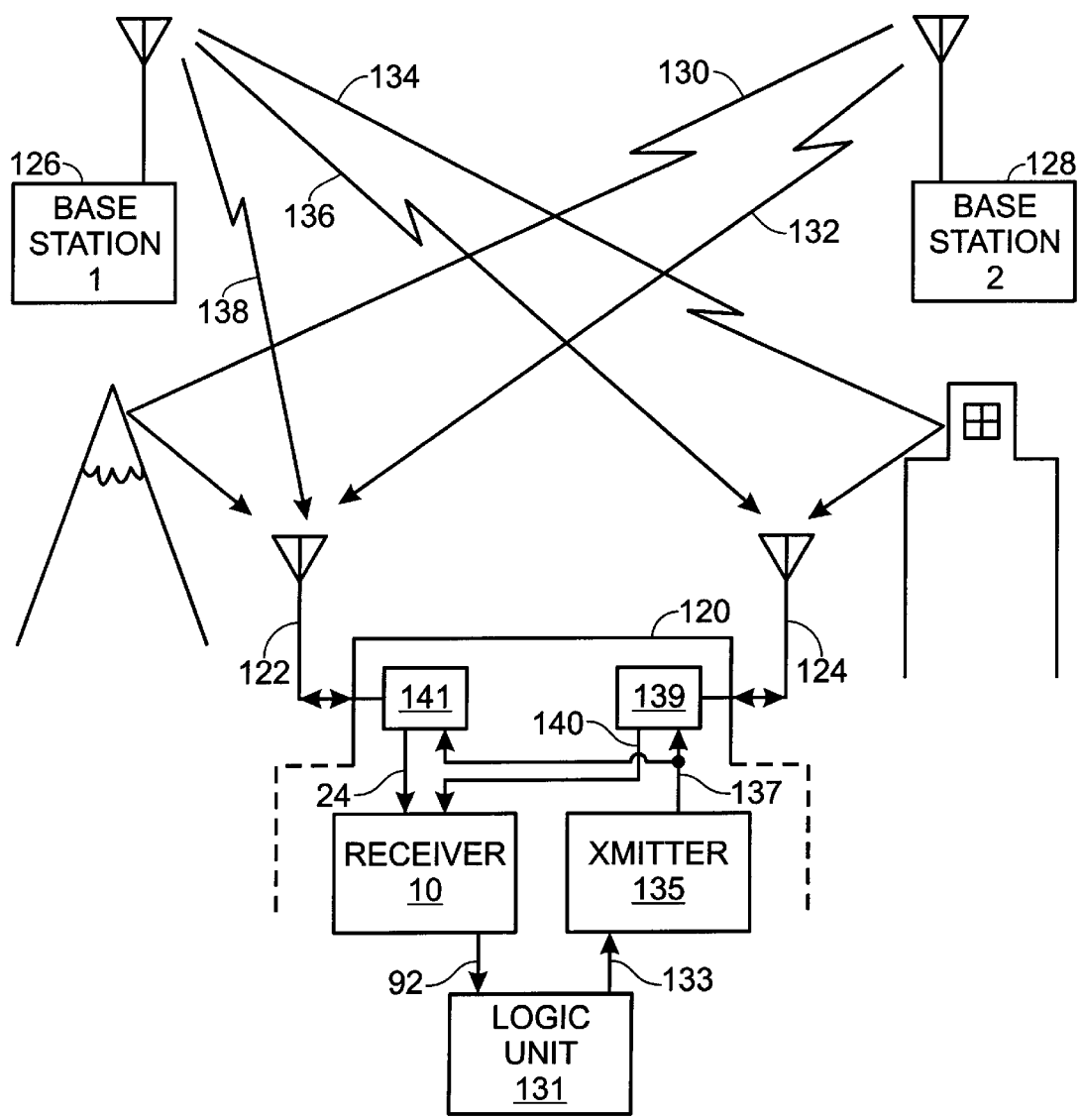
FIG. 5 represents base station transmissions radiated through space, with multipath, to a mobile station.

FIG. 5 represents base station transmissions radiated through space, with multipath, to a mobile station 120. Mobile station 120 has two antennas, first antenna 122, and second antenna 124. Mobile station 120 is receiving communications from two base stations, first base station 126, and second base station 128. Multipath between second base station 128 and mobile station first antenna 122 is shown with transmission path A, represented by reference designator 130, and transmission path B, represented by reference designator 132. Multipath between first base station 126 and mobile station second antenna 124 is shown with transmission path C, represented by reference designator 134, and transmission path D, represented by reference designator 136. FIG. 5 also presents the concept of diversity, i.e., where first base station 126 communicates to mobile station 120 through transmission path D 136 to second antenna 124, and through transmission path E 138 to first antenna 122. For the purposes of simplicity and clarity, only two base stations are shown, although mobile station 120 potentially receives communications from a plurality of base stations (not shown).

Receiver 10 of mobile station 120 further comprises first antenna 122 having an input to accept the radiated transmissions of base stations 126 and 128. Returning to FIG. 1, first antenna 122 has an output on line 24 operatively connected to receiver 10 through down-conversion circuitry (not shown) to provide broadcast and traffic channel messages in the form of a baseband signal that is the input to first matching filter 22. Likewise, second antenna 124 has an input to accept the radiated transmissions of base stations 126 and 128, and an output on line 140 operatively connected to receiver 10 to provide broadcast and traffic channel messages in the form of a down-converted baseband signal. Not shown is an automatic frequency control (AFC) circuitry to compensate the receiver RF carrier frequency for frequency drift in local oscillators (not shown) of receiver 10.

In FIG. 1, receiver 10 comprises a second filter 142 matched to despread the broadcast channel special timing symbol. Second matched filter 142 has an input operatively connected to second antenna 124 output on line 140 to accept the broadcast channel special timing symbols received for each transmission path from a base station to second antenna 124, and a first output on line 144 to provide the despread special timing symbols for each transmission path, whereby a timing pulse is provided.

First matched filter 22 input is operatively connected on line 24 to first antenna 122 output to accept the broadcast channel special timing symbols received for each transmission path from a base station to first antenna 122.

Timing and code management circuit 28 includes a third input operatively connected on line 144 to second matched filter 142 output. Broadcast channel RAKE receiver finger 50 includes a switch 146, having a first input operatively connected on line 24 to first antenna 122 output. Switch 146 has a second input operatively connected on line 140 to second antenna 124 output, and an output operatively connected on line 54 to DLL 52 second input to selectively supply the broadcast channel message from alternate antennas 122 and 124. The diversity of two antennas is used to increase the signal to noise ratio of the demodulated messages.

As shown in FIG. 5, mobile station 120 often receives communications from at least two base stations 126 and 128. As mentioned above with the discussion of second summing circuit 108, traffic channel RAKE receiver finger, such as finger 36, are grouped by transmitting base station. A logic unit 131 operatively connected to the receiver with line 92, receives broadcast channel multiplex timing information from first summing circuit 90 of broadcast channel RAKE receiver 48. A comparison of the broadcast channel timing information from the at least two base stations is made in logic unit 131. Logic unit 131 has an output on line 133 to provide a message requesting a timing adjustment to the traffic channel transmission of at least one base station.

A transmitter 135 has an input operatively connected to the logic unit output on line 133 to receive traffic channel timing requests. Transmitter 135 has an output on line 137, through duplexers 139 and 141, to transmit messages to base stations 126 and 128. Typically, receiver 10 makes such a request when communication between receiver 10 and a base station is initially established, so that the timing relationships are set for the duration of the communications. Alternately, the timing is adjusted in response to mobile station communications with other base stations, doppler effects, and propagation delays.

Returning to FIG. 1, in some aspects of the invention, second summing circuit 108 is a plurality of summing circuits, although for the purpose of clarity only one summing circuit 108 is shown. The outputs of two such additional second summing circuits are represented by dotted lines 110a and 10b. Each second summing circuit 108 is assigned to a different base station to sum the multipathed traffic channel data symbols of a selected base station.

A third summing circuit 148 has a plurality of inputs, lines 110, 110a, and 110b are shown in FIG. 1, operatively connected to second summing circuits 108 (and other second summing circuits not shown). A greater or lesser number of lines are input into third summing circuit 148 in other aspects of the invention. An output on line 150 provides the sum of the traffic channel data symbols of different transmitting base stations. The traffic channel symbols from multiple base stations are summed for an enhanced signal to noise ratio signal.

To increase to data rate of a received signal, in some aspects of the invention a plurality of traffic channel RAKE circuits, such as traffic channel RAKE 34 are operated in parallel to receive, despread and demodulate a plurality of traffic channels. For the purpose of clarity these additions traffic channel RAKEs are not shown in FIG. 1, but their operation is the same as traffic channel RAKE 34.

To obtain the soft decisions, RAKE estimation and weighting circuits 80 and 104 of all the channels need the channel coefficients. All the channels have pilot symbols which can be used to estimate the channel coefficients. The pilot, or special timing symbols within each of the channels can be used to estimate the coefficients for that channel.

The channel parameters are estimated by multiplying the known pilot symbols with the received signal corresponding to the pilot symbols. Then, these parameters are interpolated to obtain an estimate of the channel parameters during the unknown symbol transmission.

To be more specific, let the received signal be despread and resolved into L path components. Let the number of pilot symbols in one slot be P. Without loss of generality, it is assumed that the detection is performed on the symbols in the $k^{th}$ slot. Let the sampled despread signal be $r_{d,l}(m+kN)$, at time $t=mT$, for the $m^{th}$ symbol in the slot for the $l^{th}$ path ($l=0, \ldots, L-1; m=0, \ldots, N-1$), where N is the number of symbols in a slot. Assuming that a pilot symbol is $p(k,m)$, the channel estimate during the pilot symbol transmission ($m=0, \ldots, P-1$) is $$c_{d,l}(m+kn)=(p^*(k,m)r_{d,l}(m+kn))/2 \tag{1}$$

To compute the channel estimates, we first compute the following refined estimate:

$$\varepsilon_{d,l,k} = \sum_{m=0}^{P-1} c_{d,l}(m+kn) \tag{2}$$

The faded complex envelope at the coded data symbol position at $t=mT$, $m=P, \ldots, N-1$ is then estimated by the first order interpolation and is given by, $$\phi_{d,l}(m+kn)=(1-(m-(P-1)/2)/N)\epsilon_{d,l,k}+((m-(P-1)/2)/N)\epsilon_{d,l,k+1} \tag{3}$$

detection is achieved by multiplying the despread signal with the corresponding complex conjugate of the channel estimate based on the above expression. Thus, the output of the RAKE combiner for the $m^{th}$ symbol in the slot would be given by $$r(m) = \sum_{l=0}^{L-1} r_{d,l}(m+kn)\varphi_{d,l}^*(m+kn) \tag{4}$$

$$m = P, \cdots, N-P-1$$

This output sample is then decomposed into the real and imaginary components. Hard decisions are made on these components and are associated with the first and second bits of the $m^{th}$ QPSK symbol in the slot. The estimate performed using equation 3, however, contains the noise of frequencies of up to the symbol rate. Since the doppler frequencies that vary the channel are far below any symbol rate, the estimates can be smoothened. To this end, the refined estimates in equation 2 are smoothed by a low-pass filter whose cut-off frequency is higher than the Doppler rate. Interpolation proceeds based on equation 4.

The procedure described above can be done on each of the channels to get the channel estimates. However, a repetition of procedures is avoided if channel estimation is done only on one single channel, and the estimate then used for decoding other channels. Since the perch channel typically has power that is significantly higher than the other channels, and pilot symbols of a longer duration than any other channels, it is the ideal choice.

While performing the channel estimation from the perch channel for application to other channels, the estimate given in equation 2 cannot be used directly. This is because the frame in the perch channel is not synchronized with the frame in the traffic channel. Consequently, there will be a delay of Δ between the slot boundaries for the two channels. Further, the quantity in equation 2 is computed for the time instant $((RP-1)/2)T-\Delta$ in each slot for the perch channel, where R is the ratio of symbol rate on the perch channel to the symbol rate on the traffic channel. Thus, the computation in equation 3 should be changed to $$\phi_{d,l}(m+kn)=(1-\tau)\epsilon_{d,l,k}+\tau\epsilon_{d,l,k+1} \tag{5}$$

where $$\tau=(m-(RP-1)/2)/N-(\Delta/T) \tag{6}$$

where longer delays in channel estimation are tolerable, traffic channel data is interpolated. That is, the traffic channel weights are formed in response to weights from the present slot's perch channel pilot symbols, and the succeeding slot's perch channel pilot symbols, as represented below:

$$w_{traffic} = a(w[n]) + b(w[n+1]) \quad (7)$$

where $w_{traffic}$ is the traffic channel weight at the $n^{th}$ instant of time, w[n] is the channel weight derived from the perch channel at the nth instant, and a and b are constants. For certain data, such as the TPC bit, extrapolation is used, as represented below:

$$w_{power\ control} = a(w[n]) + b(w[n-1]) \quad (8)$$

where $w_{traffic}$ is the channel weight for the power control symbols at the $n^{th}$ instant of time, w[n] is the channel weight derived from the broadcast channel at the $n^{th}$ instant of time, and a and b are constants. Both interpolation and extrapolation procedures are extended to do polynomial fits of channel estimates over multiple slots, in some aspects of the invention.

For the decoding of certain symbols, like TPC, the decoding needs to be done before the next slot estimation can be performed. In such situations, extrapolation needs to be performed. Also, in some other functions like AFC, waiting for the next slot would increase the transport delay. Again, to minimize this delay, extrapolation needs to be performed.

As shown in FIG. 2, a radio frame of 10 milliseconds (ms) is divided into 16 slots. Broadcast and traffic channel messages are organized into a series of time multiplexed slots. Broadcast and traffic channel RAKE receivers 80 and 104 estimate weights and phase shifts to apply to the demodulation of the traffic channel data symbols through an interpolation process using the weight and phase shift estimates from present, as well as succeeding slots.

As presented above, and shown in traffic channel 18 of FIG. 2, the traffic channel data symbols include at least one transmit power control (TPC) bit. Broadcast and traffic channel RAKE receivers estimate weights and phase shifts to apply to the demodulation of the TPC bit through an extrapolation process using the weight and phase shift estimates from present, as well as previous slots.

Figure 6:
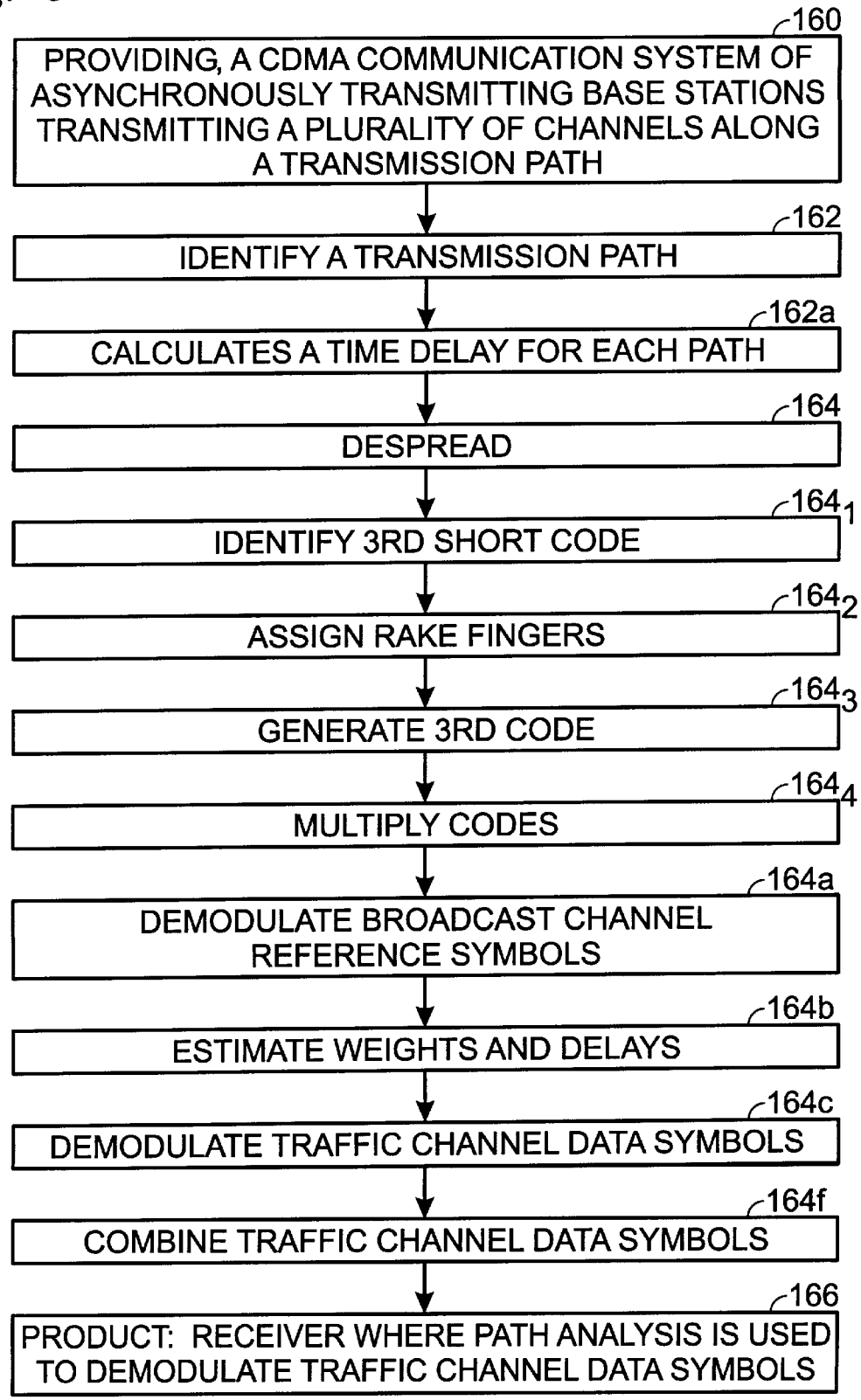
FIG. 6 is a flow chart illustrating steps in a method for a mobile station to receive base station communications in accordance with the present invention.

FIG. 6 is a flow chart illustrating steps in a method for a mobile station to receive base station communications in accordance with the present invention. Step 160 provides a code division multiple access (CDMA) communication system including a plurality of base stations asynchronously transmitting information to a plurality of mobile stations. The communications from a base station to a mobile station are formatted in a plurality of channels and propagated along at least one transmission path, with a corresponding path delay. Step 162, for each base station from which a communication is received, identifies at least one transmission path between a base station and the mobile station. Step 164, in response to the transmission paths identified in Step 162, despreads at least one received communication. Step 166 is a product, a receiver where multipath timing analysis is used in despreading data.

In some aspects of the invention, Step 160 provides that each base station transmission include a broadcast channel message with a plurality of time multiplexed symbols, including a predetermined special timing symbol known to each mobile station. Then, Step 162 includes, for each transmission path identified in Step 162, despreading the special timing symbol, whereby broadcast channel multiplex timing information is derived. A further step, following Step 162, is included. Step 162a, in response to special timing symbol despread in Step 162, calculates channel timing information for each transmission path detected in Step 162. Then, Step 164 includes despreading received communications in response to the channel timing information calculated in Step 162a.

Step 160 provides a transmitted broadcast channel message which includes time multiplexed data symbols and predetermined time multiplexed reference symbols known to the mobile station. Then, Step 164 includes despreading the broadcast channel data and reference symbols.

Step 160 provides that each base station transmit at least one traffic channel message, unique to each mobile station. The traffic channel has a plurality of time multiplexed data symbols. Step 164 includes despreading the traffic channel data symbols.

Step 160 provides that the reference and data symbols for both the traffic and broadcast channels be modulated before transmission. Further steps, following Step 164, are then included. Step 164a, in response to the broadcast channel reference symbols despread in Step 164, demodulates the broadcast channel reference symbols to provide transmission path weights and phase shift information. Step 164b, in response to the weights and phase shifts provided during the demodulation of the broadcast channel reference symbols, estimates weights and phase shifts to apply to data symbols. Step 164c, in response to estimations made in Step 164b, demodulates the traffic channel data symbols.

In some aspects of the invention, Step 160 provides that each traffic channel message include predetermined time multiplexed reference symbols known to each mobile station, which are modulated before transmission. Then, Step 164 includes despreading the traffic channel reference symbols. Further steps, following Step 164a, are included, but not shown. Step $164a_1$, in response to the traffic channel reference symbols despread in Step 164, demodulates the traffic channel reference symbols to provide transmission path weights and phase shift information. Step $164b_1$, in response to the weights and phase shifts provided from the demodulation of the traffic channel reference symbols, estimates weights and phase shifts to apply to the traffic channel data symbols. Then, Step 164c includes demodulating the traffic channel data symbols in response to the weights and phase shifts estimated in Step $164b_1$.

In some aspects of the invention further steps, following Step 164c, are included. Step 164d (not shown), in response to estimations made in Step 164b, demodulates the broadcast channel data symbols. Step 164e (not shown), for all base stations, combines the broadcast channel data symbols demodulated in Step 164d for each transmission path identified in Step 162, whereby the signal to noise ratio of a received message is improved. Following Step 164c, Step 164f combines the traffic channel data symbols demodulated in Step 164c for each transmission path identified in Step 162, whereby the signal to noise ratio of a received message is improved.

Step 160 provides that the transmitted broadcast channel data and reference symbols are spread with a predetermined long code, unique to each base station. Then, Step 162 includes identifying the long code used to spread the broadcast channel message received on each transmission path, whereby a base station is identified. Step 164 includes generating the long code identified in Step 162 to despread the broadcast channel reference and data symbols, and the traffic channel reference and data symbols.

Step 160 provides that each base station spread the broadcast channel special timing symbol with only a predetermined first short code, and that each mobile station have at least a first matched filter to despread the first short code. Step 162a includes the despreading of every received broadcast channel special timing symbol to yield the identification of distinct transmission paths in Step 162.

Step 160 provides that each mobile station include a second matched filter, with the first matched filter operatively connected to a first antenna and the second matched filter operatively connected to a second antenna. Then, Step 162 includes the identification of transmissions paths from the base station to each of the mobile station antennas, whereby the diversity of the mobile station receiver is enhanced with the use of independent transmission paths.

Step 160 provides that the broadcast channel data and reference symbols are spread with a predetermined second short code, and the transmitted broadcast and traffic channel messages are modulated at a first chip rate. Step 160 also provides that the mobile station include a broadcast channel RAKE receiver with a plurality of fingers. Then, Step 164 assigns a broadcast channel RAKE receiver finger to each transmission path identified in Step 162 to generate short and long codes, and in response to generated short and long codes, generates a clock signal at the first chip rate. The chip rate is generated for use by every channel of the assigned transmission path.

Step 160 provides that each base station assign each mobile a third short code, unique to each mobile station. The base station spreads the traffic channel message to a mobile station with its assigned third short code. Each mobile station includes a traffic channel RAKE receiver with a plurality of fingers. Step 164 includes multiplying the broadcast channel data and reference symbols by the long code to generate a long code despread signal. Step 164 is divided into sub-steps. Sub-step $164_1$, for each transmission path identified in Step 162, identifies the transmitted traffic channel messages spread with the mobile station's third short code. Sub-step $164_2$, for each transmission path identified in Step 162, assigns a traffic channel RAKE receiver finger to the corresponding broadcast channel RAKE receiver finger assigned in Step 164. Sub-step $164_3$, in response to the first chip rate clock signal generated in Step 164, generates the third short code. Sub-step $164_4$ multiplies the long code despread signal generated in Step 164 by the third short code generated in Sub-step $164_3$, to completely despread the traffic channel message.

In some aspects of the invention Step 160 provides that each mobile station includes a transmitter. Then, Step 162 includes receiving communications from at least two base stations, a first base station and a second base station. Step 162 includes identifying at least one transmission path between each base station and the mobile station. Further steps (not shown), follow Step 164. Step 164g, in response to the despreading of the broadcast channel of the first base station, transmits a request to the second base station to adjust the timing of the traffic channel transmission, whereby the timing differences between the first and second base stations are minimized. Step 164h receives the adjusted traffic channel transmission of the second base station, and Step 164i, in response to Step 164f, sums the combined traffic channel demodulated data symbols for the first and second base station, whereby diversity is increased with the use of two base stations.

Step 160 includes the broadcast and traffic control messages being organized into a series of time multiplexed slots. Step 164b includes broadcast and traffic channel RAKE receivers estimating weights and phase shifts to apply, to the demodulation of traffic channel data symbols in Step 164c, through an interpolation process using the weight and phase shift estimates from present, as well as succeeding slots. In other aspects of the invention, Step 160 includes the traffic channel data symbols including a transmit power control (TPC) bit. Step 164c includes demodulating the TPC bit with the traffic channel data symbols, and Step 164b includes broadcast and traffic channel RAKE receivers estimating weights and phase shifts, to apply to the demodulation of the TPC bit in Step 164c, through an extrapolation process using the weight and phase shift estimates from present, as well as previous slots.

FIG. 7 is a flow chart illustrating steps in a method for a mobile station to receive base station communications in accordance with an aspect of the present invention. Step 170 provides a code division multiple access (CDMA) communication system having a plurality of base stations asynchronously transmitting to a plurality of mobile stations. The communications from a base station to a mobile station being formatted in a plurality of coded channels including a broadcast channel message propagating along at least one transmission path, with a corresponding path delay. The broadcast channel message includes predetermined time multiplexed reference and special timing symbols. Step 172 despreads at least one broadcast channel special timing symbol. Step 174 identifies a transmission path in response to each broadcast channel special timing symbol despread in Step 172. Step 176 despreads the broadcast channel reference symbols for each transmission identified in Step 174. Step 178, in response to the broadcast channel reference symbols despread in Step 176, identifies at least one base station from which transmissions are being received. Step 180 is a product, a method of receiving asynchronous base station messages where the codes and timing for each communicating base station are derived by the mobile station.

In some aspects of the invention, Step 170 provides that each base station transmit at least one traffic channel message, unique to each mobile station. Each traffic channel message includes time multiplexed data symbols. Further steps, following Step 178, are included. Step 178a, in response channel timing determined in Step 172, and the base station identification made in Step 178, despreads the broadcast and traffic channel messages for each transmission path identified in Step 174. Step 178b, in response to the broadcast channel reference symbols despread in Step 178a, demodulates the broadcast channel reference symbols. Step 178c, in response to Step 178b, interpolates weights and phase shifts for demodulating the traffic channel data symbols. Step 178d, for each base station identified in Step 178, combines the traffic channel data symbols demodulated from each transmission path identified in Step 174, with the weights and phase shifts interpolated in Step 178c, whereby the signal to noise ratio of a base station transmission is improved.

Step 170 provides that the traffic channel include predetermined time multiplexed reference symbols. Then Step 178a includes despreading the traffic channel reference symbols, Step 178b includes demodulating the traffic channel reference symbols, and Step 178c includes interpolating weights and phase shifts in response to the demodulated traffic channel reference symbols.

FIG. 8 is a flow chart illustrating the present invention's method for a mobile station to synchronize communications from at least two asynchronously transmitting base stations. Step 200 provides a code division multiple access (CDMA)

communication system having a plurality of base stations asynchronously communicating to a plurality of mobile stations. The communications from a base station to a mobile station being formatted in a plurality of coded channels including a broadcast channel message and a traffic channel message propagating along at least one transmission path, with a corresponding path delay. The broadcast channel message includes predetermined time multiplexed reference and special timing symbols, and the traffic channel includes time multiplexed data symbols.

Step 202 despreads at least one broadcast channel special timing symbol from each base station. Step 204 establishes the broadcast channel multiplex timing for a transmission path, in response to each broadcast channel special timing symbol despread in Step 202. Step 206 despreads the broadcast channel reference symbols for each transmission path identified in Step 204. Step 208, in response to the broadcast channel reference symbols despread in Step 206, identifies at least two base stations from which transmissions are being received.

Step 210 demodulates the broadcast channel reference symbols for each transmission path identified in Step 204. Step 212, in response to the broadcast channel reference symbols demodulated in Step 210, refines the broadcast channel multiplex timing established in Step 204. Step 214 compares the broadcast channel timing, refined in Step 210 from at least two base stations. Step 216, in response to the comparison made in Step 214, transmits a request to one of the at least two base stations to adjust its transmission of the traffic channel. Step 218 is a product, a received communication where the delay between the transmissions of traffic channels by different base stations is minimized.

Following Step 206, are further steps (not shown). Step 216*a* completely despreads the traffic channel messages for each transmission path identified in Step 204. Step 216*b* demodulates the traffic channel data symbols. Step 216*c*, for each base station identified in Step 208, combines the traffic channel data symbols demodulated in Step 216*b*. Step 216*d* sums the traffic channel data symbols combined in Step 216*c* for all the base stations identified in Step 208, whereby the signal to noise ratio of the received message is enhanced from the diversity of combining each transmission path, as well as each base station.

A receiver system and method is provided to use timing information gleaned from demodulating the perch channel, directly in the despreading and demodulation of the traffic channel. Although a traffic channel has been specifically cited, the principle of deriving all timing relationships from the perch channel is applicable to the demodulation of other channels. The perch channel generally has a higher power level and greater density of reference symbols, and it saves hardware and processor time to base all channel timing relationships on just one reference channel. Further, the perch channel is used to adjust the timing of base station traffic channel transmissions so that the same information is received from different base stations at approximately the same time. Other embodiments of the present invention will occur to those skilled in the art.

What is claimed is:

1. In a code division multiple access (CDMA) communication system including a plurality of base stations asynchronously transmitting information to a plurality of mobile stations, the communications from a base station to a mobile station being formatted in a plurality of channels propagated along at least one transmission path, with a corresponding path delay, wherein each base station transmits at least one broadcast channel message, each broadcast channel message including a plurality of time multiplexed data symbols and predetermined time multiplexed reference symbols known to each mobile station, wherein each base station transmits at least one traffic channel message, unique to each mobile station, each traffic channel message including a plurality of time multiplexed data symbols and time multiplexed reference symbols, and wherein the data symbols and the reference symbols of both the broadcast and traffic channels are modulated before transmission, a method for each mobile station to receive base station communications comprising the steps of:

for each base station from which a communication is received, identifying at least one transmission oath between the base station and the mobile station;

despreading at least one received communication for each said transmission path identified between the base station and the mobile station, including despreading the broadcast channel data and reference symbols, and despreading the traffic channel data and reference symbols; and calculating channel timing information for each transmission path identified between the base station and the mobile station, including the following steps:

in response to the broadcast channel reference symbols despread in said step of despreading at least one received communication for each said transmission path, demodulating the broadcast channel reference symbols to provide transmission path weights and phase shift information;

in response to the weights and phase shifts provided during the demodulation of the broadcast channel reference symbols, estimating weights and phase shifts to apply to data symbols; and in response to estimations made in the preceding step, demodulating the traffic channel data symbols.

2. A method as in claim 1 wherein each traffic channel message includes predetermined time multiplexed reference symbols known to each mobile station, which are modulated before transmission, in which said step of despreading at least one received communication for each said transmission path includes despreading the traffic channel reference symbols, and including the further steps, following said step of demodulating the broadcast channel reference symbols, of:

in response to the traffic channel reference symbols despread in said step of despreading at least one received communication for each said transmission path, demodulating the traffic channel reference symbols to provide transmission path weights and phase shift information;

in response to the weights and phase shifts provided from the demodulation of the traffic channel reference symbols, estimating weights and phase shifts to apply to traffic channel data symbols; and in which said step of demodulating the traffic channel data symbols includes demodulating the traffic channel data symbols in response to the weights and phase shifts estimated in the preceding step.

3. A method as in claim 1 including the further step, following the step of estimating weights and phase shifts to apply to data symbols in response to the weights and phase shifts provided during the demodulation of the broadcast channel reference symbols of:

in response to estimations made in the step of estimating weights and phase shifts to apply to data symbols in response to the weights and phase shifts provided during the demodulation of the broadcast channel reference symbols, demodulating the broadcast channel data symbols; and combining the broadcast channel data symbols demodulated in the preceding step for each transmission path identified between the base station and the mobile station whereby the signal to noise ratio of a received message is improved.

4. A method as in claim 1 including the further step, following the step of demodulating the traffic channel data symbols, of:

combining the traffic channel data symbols for each transmission path identified between the base station and the mobile station, whereby the signal to noise ratio of a received message is improved.

5. A method as in claim 4 wherein the transmitted broadcast channel data and reference symbols are spread with a predetermined long code, unique to each base station, in which the step of identifying at least one transmission path between the base station and the mobile station includes identifying the long code used to spread the broadcast channel message received on each transmission path, whereby a base station is identified, and in which the step of despreading at least one received communication for each said transmission path identified between the base station and the mobile station includes generating the long code identified in the step of identifying at least one transmission path between the base station and the mobile station to despread the broadcast channel reference and data symbols, and the traffic channel reference and data symbols.

6. A method as in claim 5 wherein each base station spreads the broadcast channel special timing symbol with only a predetermined first short code, wherein each mobile station has at least a first matched filter to despread the first short code, and in which the despreading of every received broadcast channel yields the identification of distinct transmission paths.

7. A method as in claim 6 wherein each mobile station includes a second matched filter, with the first matched filter operatively connected to a first antenna and the second matched filter operatively connected to a second antenna, and in which the step of identifying at least one transmission path between the base station and the mobile station includes the identification of transmissions paths from the base station to each of the mobile station antennas, whereby the diversity of the mobile station receiver is enhanced with the use of independent transmission paths.

8. A method as in claim 6 wherein the broadcast channel data and reference symbols are spread with a predetermined second short code, wherein the transmitted broadcast and traffic channel messages are modulated at a first chip rate, wherein the mobile station includes a broadcast channel RAKE receiver with a plurality of fingers, in which the step of despreading at least one received communication for each said transmission path assigns a broadcast channel RAKE receiver finger to each transmission path identified in the step of identifying at least one transmission path between the base station and the mobile station to generate short and long codes, and in response to generated short and long codes, generating a clock signal at the first chip rate, whereby the chip rate is generated for use with every channel of the assigned transmission path.

9. A method as in claim 8 wherein each base station assigns each mobile a third short code, unique to each mobile station, wherein the base station spreads the traffic channel message to a mobile station with its assigned third short code, wherein each mobile station includes a traffic channel RAKE receiver with a plurality of fingers, in which the step of despreading at least one received communication for each said transmission path includes multiplying the broadcast channel data and reference symbols by the long code, to generate a long code despread signal, and including further sub-steps of the step of despreading at least one received communication for each said transmission path, of:

for each transmission path identified in the step of identifying at least one transmission path between the base station and the mobile station, identifying the transmitted traffic channel messages spread with the mobile station's third short code;

for each transmission path identified in the step of identifying at least one transmission path between the base station and the mobile station, assigning a traffic channel RAKE receiver finger to the corresponding broadcast channel RAKE receiver finger assigned in the step of despreading at least one received communication for each said transmission path;

in response to the first chip rate clock signal generating the third short code; and multiplying the long code despread signal by the third short code to completely despread the traffic channel message.

10. A method as in claim 9 wherein each mobile station includes a transmitter, in which the step of identifying at least one transmission path between the base station and the mobile station includes receiving communications from at least two base stations, a first base station and a second base station, and includes identifying at least one transmission path between each base station and the mobile station, and including the further steps, following the step of despreading at least one received communication for each said transmission path, of:

in response to the despreading of the broadcast channel of the first base station, transmitting a request to the second base station to adjust the timing of the traffic channel transmission, whereby the timing differences between the first and second base stations are minimized;

receiving the adjusted traffic channel transmission of the second base station; and in response to the step of combining the traffic channel data symbols for each transmission path identified between the base station and the mobile station, summing the combined traffic channel demodulated data symbols for the first and second base station, whereby diversity is increased with the use of two base stations.

11. A method as in claim 1 wherein broadcast and traffic control messages are organized into a series of time multiplexed slots, and in which the step of estimating weights and phase shifts to apply to data symbols includes broadcast and traffic channel RAKE receivers estimating weights and phase shifts to apply, to the demodulation of traffic channel data symbols, through an interpolation process using the weight and phase shift estimates from present, as well as succeeding slots.

12. A method as in claim 1 wherein broadcast and traffic control messages are organized into a series of time multiplexed slots, and the traffic channel data symbols include a transmit power control (TPC) bit, in which the step of demodulating the traffic channel data symbols includes demodulating the TPC bit with the traffic channel data symbols, and in which the step of estimating weights and phase shifts to apply to data symbols includes broadcast and traffic channel RAKE receivers estimating weights and phase shifts, to apply to the demodulation of the TPC bit, through an extrapolation process using the weight and phase shift estimates from present, as well as previous slots.

13. In a code division multiple access (CDMA) communication system having a plurality of base stations asynchronously transmitting to a plurality of mobile stations, the communications from a base station to a mobile station being formatted in a plurality of coded channels including a broadcast channel message propagating along at least one transmission path, with a corresponding path delay, the broadcast channel message including predetermined time multiplexed reference and special timing symbols, wherein each base station transmits at least one traffic channel message, unique to each mobile station, each traffic channel message including time multiplexed data symbols, a method for each mobile station to receive base station communications comprising the steps of:

a) despreading at least one broadcast channel special timing symbol;

b) identifying a transmission path in response to each broadcast channel special timing symbol despread in Step a);

c) despreading the broadcast channel reference symbols for each transmission path identified in Step b); and d) in response to the broadcast channel reference symbols despread in Step c), identifying at least one base station from which transmissions are being received, whereby the codes and timing for each communicating base station are derived by the mobile station;

e) in response to broadcast channel timing determined in Step a) and the base station identification made in Step d), despreading the broadcast and traffic channel messages for each transmission path identified in Step b);

f) in response to the broadcast channel reference symbols despread in Step e), demodulating the broadcast channel reference symbols;

g) in response to Step f), interpolating weights and phase shifts, to demodulate the traffic channel data symbols; and h) for each base station identified in Step d), combining the traffic channel data symbols demodulated from each transmission path identified in Step b), with the weights and phase shifts interpolated in Step g), whereby the signal to noise ratio of a base station transmission is improved.

14. A method as in claim 13 wherein the traffic channel message includes predetermined time multiplexed reference symbols, in which Step e) includes despreading the traffic channel reference symbols, in which Step f) includes demodulating the traffic channel reference symbols, and in which Step g) includes interpolating weights and phase shifts in response to the demodulated traffic channel reference symbols.

15. In a code division multiple access (CDMA) communication network having a plurality of base stations asynchronously transmitting information including coded communications to a plurality of mobile stations, the coded communications from a base station to a mobile station being formatted in a plurality of channels including a broadcast channel message and at least one traffic channel message, with each broadcast and traffic channel message propagated along at least one transmission path, with a corresponding path delay, the broadcast channel message including predetermined time multiplexed reference symbols and a special timing symbol, the traffic channels message including time multiplexed data symbols, wherein each base station is assigned a unique long code, and the base stations transmit broadcast channel reference symbols spread with their long code, a mobile station receiver to accept base station communications comprising:

at least a first filter matched to despread the broadcast channel special timing symbol, said first matched filter having an input to accept the broadcast channel special timing symbol received for each transmission path from a communicating base station, and a first output to provide the despread special timing symbol for each transmission path, whereby multiplex timing information for the broadcast channel is provided;

a timing and code management circuit having a first input operatively connected to said first matched filter output to accept despread special timing symbols for each transmission path, said timing and code management circuit having a first output to provide the despread special timing symbol for each transmission path, and a second output to provide channel multiplex timing information and base station identification for each transmission path;

a traffic channel RAKE receiver having a plurality of fingers, each finger having an input operatively connected to said timing and code management circuit second output, each said finger using the broadcast channel multiplex timing and base station identification information provided by said timing and code management circuit to despread the traffic channel data symbols for each transmission path, whereby the timing and coding needed to despread the traffic channel results from despreading the broadcast channel;

a searcher unit having a first input to accept the broadcast channel reference symbols for each transmission path, a second input operatively connected to said timing and code management circuit first output to accept the despread broadcast channel special timing symbol for each transmission path, said searcher unit identifying the long code for the broadcast channel received on each transmission path, said searcher unit having an output to provide the long code of the broadcast channel for each transmission path, whereby the base station is identified; and in which said timing and code management circuit includes a second input operatively connected to said searcher unit output to accept the identified broadcast channel long code for each transmission path, and in which said second output provides broadcast channel long codes, as well as channel timing information, for each transmission path.

16. A receiver as in claim 15 wherein each base station transmits broadcast and traffic channels messages modulated at a predetermined first chip rate, wherein the transmitted broadcast channel special timing symbols are spread with just a predetermined first short code, wherein the broadcast channel reference symbols are spread with the long code and a predetermined second short code, and wherein the traffic channel data symbols are spread with the long code, the mobile station receiver further including a broadcast channel RAKE receiver with a plurality of fingers, with each finger assigned to a transmission path, and in which each finger of said broadcast channel RAKE receiver comprises:

a delay locked loop (DLL) having a first input operatively connected to the output of said timing and code management circuit, a second input to accept broadcast and traffic channel messages, and a first output to provide the first chip rate clock signal.

17. A receiver as in claim 16 wherein each base station modulates the transmitted data and reference symbols, wherein broadcast channel messages include data symbols spread by the long code and the second short code, in which said DLL has a second output to provide the despread broadcast channel data and reference symbols, and each said broadcast channel RAKE receiver finger further comprising:

a broadcast channel estimation and weighting circuit having an input operatively connected to said DLL second output to receive the despread broadcast channel reference and data symbols, said broadcast channel estimation and weighting circuit demodulating the broadcast channel reference symbols to determine the assigned transmission path weights and phase shifts, and to estimate weights and phase shifts to apply during the demodulation of broadcast and traffic channel data symbols, said broadcast channel finger estimation and weighting circuit having a first output to provide the demodulated broadcast channel data symbols, and a second output to provide weight and phase shift estimations for use with the traffic channel of the assigned transmission path.

18. A receiver as in claim 17 further comprising:

a first summing circuit having a plurality of inputs operatively connected to said broadcast channel estimation and weighting circuit first output of each said broadcast channel RAKE receiver finger, said first summing circuit combining the demodulated broadcast channel data symbols to provide an output with demodulated broadcast channel data symbols having an improved signal to noise ratio, whereby multipathed broadcast channel messages are combined.

19. A receiver as in claim 18 wherein the base station assigns a third short code to each mobile station, which is unique for each mobile station, and transmitted traffic channel data symbols are spread with the third short code, in which said broadcast channel DLL has a third output to provide the long code despread signal which is a product of the long code multiplied by broadcast and traffic channel messages, and in which each finger of said traffic channel RAKE receiver corresponds to a finger of said broadcast channel receiver having the same assigned transmission path, each said traffic channel RAKE receiver finger comprising:

a traffic channel code generator to generate the third short code, said traffic channel code generator having an input operatively connected to said DLL first output to accept the first chip rate clock signal, and an output to provide the mobile station's assigned third short code at a rate matching the traffic channel message received on that transmission path; and a traffic channel mixer having a first input operatively connected to said traffic channel short code generator output, a second input operatively connected to said DLL third output in said corresponding broadcast channel finger, to accept the long code despread signal, and an output to provide the despread traffic channel data symbols.

20. A receiver as in claim 19 in which each said traffic channel finger further comprises:

a traffic channel estimation and weighting circuit having a first input operatively connected to the output of said traffic channel mixer to accept the despread traffic channel data symbols, a second input operatively connected to said broadcast channel estimation and weighting circuit second output in said corresponding broadcast channel finger, said traffic channel estimation and weighting circuit accepting the estimated weights and phase shifts from the broadcast channel estimation and weighting circuit to aid in the demodulation of the traffic channel data symbols, said traffic channel finger estimation and weighting circuit having a first output to provide the demodulated traffic channel data symbols.

21. A receiver as in claim 20 in which said traffic channel estimation and weighting circuit demodulates the traffic channel reference symbols to determine the assigned transmission path weights and phase shifts, and estimates the weights and phase shifts for application in the demodulation of traffic channel data symbols.

22. A receiver as in claim 21 further comprising:

a second summing circuit having a plurality of inputs operatively connected to said traffic channel estimation and weighting circuit output of each said traffic channel RAKE receiver finger for a transmitting base station, said second summing circuit having an output to provide the sum of the demodulated traffic channel data symbols for each transmission path from a base station, whereby the signal to noise ratio of the received information is improved by combining signals of each transmission path.

23. A receiver as in claim 22 wherein the base station transmissions are radiated through space, and further comprising:

a first antenna having an input to accept the radiated transmissions of the base stations and an output to provide broadcast and traffic channel messages;

a second antenna having an input to accept the radiated transmissions of the base stations and an output to provide broadcast and traffic channel messages;

a second filter matched to despread the broadcast channel special timing symbol, said second matched filter having an input operatively connected to said second antenna output to accept the broadcast channel special timing symbols received for each transmission path from a base station to said second antenna, and a first output to provide the despread special timing symbols for each transmission path, whereby a timing pulse is provided;

in which said first matched filter input is operatively connected to said first antenna output to accept the broadcast channel special timing symbols received for each transmission path from a base station to said first antenna;

in which said timing and code management circuit includes a third input operatively connected to said second matched filter output; and in which each said broadcast channel RAKE receiver finger includes a switch having a first input operatively connected to said first antenna output, a second input operatively connected to said second antenna output, and an output operatively connected to said DLL second input to selectively supply the broadcast and traffic channel messages from alternate antennas, whereby the diversity of two antennas is used to increase the signal to noise ratio of the demodulated messages.

24. A receiver as in claim 22 wherein traffic channel RAKE receiver fingers are grouped by transmitting base station, wherein the receiver receives communications from at least two base stations, and further comprises:

a logic unit operatively connected to the receiver to receive broadcast channel multiplex timing information from each said broadcast channel RAKE finger, and to compare the broadcast channel timing information from the at least two base stations, said logic unit having an output to provide a message requesting a timing adjustment to the traffic channel of at least one base station;

a transmitter having an input operatively connected to the logic unit output to receive traffic channel timing requests, said transmitter having an output to transmit timing adjustment messages to communicating base stations;

in which said second summing circuit is a plurality of summing circuits, with each said second summing circuit summing the multipathed traffic channel data symbols of a different transmitting base station; and a third summing circuit having a plurality of inputs operatively connected to said second summing circuit outputs, and an output to provide the sum of the traffic channel data symbols of different transmitting base stations, whereby the traffic channel symbols from multiple base stations are summed for an enhanced signal to noise ratio message.

25. A receiver as in claim 24 wherein broadcast and traffic control messages are organized into a series of time multiplexed slots, and in which said broadcast and traffic channel RAKE receivers estimate weights and phase shifts to apply to the demodulation of traffic channel data symbols through an interpolation process using the weight and phase shift estimates from present, as well as succeeding slots.

26. A receiver as in claim 24 wherein broadcast and traffic control messages are organized into a series of time multiplexed slots, and the traffic channel data symbols include a transmit power control (TPC) bit, and in which said broadcast and traffic channel RAKE receivers estimate weights and phase shifts to apply to the demodulation of the TPC bit through an extrapolation process using the weight and phase shift estimates from present, as well as previous slots.

27. In a code division multiple access (CDMA) communication system having a plurality of base stations asynchronously communicating to a plurality of mobile stations, the communications from a base station to a mobile station being formatted in a plurality of coded channels including a broadcast channel message and a traffic channel message propagating along at least one transmission path, with a corresponding path delay, the broadcast channel message including predetermined time multiplexed reference and special timing symbols, and the traffic channel message including time multiplexed data symbols, a method for each mobile station to synchronize communications from at least two base stations comprising the steps of:

a) despreading at least one broadcast channel special timing symbol from each base station;

b) establishing the broadcast channel multiplex timing for a transmission path, in response to each broadcast channel special timing symbol despread in Step a);

c) despreading the broadcast channel reference symbols for each transmission path identified in Step b);

d) in response to the broadcast channel reference symbols despread in Step c), identifying at least two base stations from which transmissions are being received;

e) demodulating the broadcast channel reference symbols for each transmission path identified in Step b);

f) in response to the broadcast channel reference symbols demodulated in Step e), refining the broadcast channel multiplex timing established in Step b);

g) comparing the broadcast channel timing, refined in Step e) from at least two base stations; and h) in response to the comparison made in Step g), transmitting a request to one of the at least two base stations to adjust its transmission of the traffic channel, whereby the delay between the transmissions of traffic channels by different base stations is minimized.

28. A method as in claim 27 comprising the further steps, following Step c), of:

i) completely despreading the broadcast and traffic channel messages for each transmission path identified in Step b);

j) demodulating the traffic channel data symbols;

k) for each base station identified in Step d), combining the traffic channel data symbols demodulated in Step j); and l) summing the traffic channel data symbols combined in Step k) for all the base stations identified in Step d), whereby the signal to noise ratio of the received message is enhanced from the diversity of combining each transmission path, as well as each base station.

* * * * *